(12) United States Patent
Memmer et al.

(10) Patent No.: US 10,274,097 B2
(45) Date of Patent: Apr. 30, 2019

(54) FUEL LIMIT VENT VALVE HAVING VAPOR PERMEABLE MEMBRANE

(71) Applicant: Eaton Corporation, Cleveland, OH (US)

(72) Inventors: Matthew Memmer, Plymouth, MI (US); Curtis T. Moy, Oxford, MI (US); Vaughn K. Mills, Chelsea, MI (US); Sreenivas Pai, Pune (IN); Sanjay Mohite, Pune (IN)

(73) Assignee: Eaton Corporation, Cleveland, OH (US)

( * ) Notice: Subject to any disclaimer, the term of this patent is extended or adjusted under 35 U.S.C. 154(b) by 162 days.

(21) Appl. No.: 15/184,603

(22) Filed: Jun. 16, 2016

(65) Prior Publication Data

US 2016/0290520 A1    Oct. 6, 2016

Related U.S. Application Data

(63) Continuation of application No. PCT/US2015/065682, filed on Dec. 15, 2012, and a
(Continued)

(51) Int. Cl.
*F16K 24/04*    (2006.01)
*F16K 31/22*    (2006.01)
(Continued)

(52) U.S. Cl.
CPC ...... *F16K 24/044* (2013.01); *B60K 15/03519* (2013.01); *F01N 3/2066* (2013.01);
(Continued)

(58) Field of Classification Search
CPC ........ F16K 24/044; F16K 1/126; F16K 31/22; B60K 15/03519; B60K 2015/03289;
(Continued)

(56) References Cited

U.S. PATENT DOCUMENTS 6,779,544 B2 * 8/2004 Devall ............. B60K 15/03519
137/202
8,317,053 B2 * 11/2012 Cronin ............... B65D 43/0229
215/222

(Continued)

FOREIGN PATENT DOCUMENTS

CA         2824340 A1    7/2012
DE   202005020971 U1   12/2006
(Continued)

OTHER PUBLICATIONS

International Search Report and Written Opinion for International Application No. PCT/US2014/071118 dated Jun. 25, 2015, 16 pages.

(Continued)

*Primary Examiner* — Kevin F Murphy
*Assistant Examiner* — Patrick C Williams
(74) *Attorney, Agent, or Firm* — RMCK Law Group PLC

(57) ABSTRACT

A fill limit vent valve configured for use with a reductant tank includes a valve body, a float and a vapor permeable membrane. The valve body can define an inner chamber and has a valve outlet. The float has a float body configured to be received within the inner chamber and configured to sealingly engage the valve body. The vapor permeable membrane can be configured to permit vapor to pass through while inhibiting liquid from passing through. The float is movable between (i) an open position wherein vapor flows along a first flow path through the valve inner chamber and out of the valve body; and (ii) a closed position wherein the float sealingly engages the valve body and precludes vapor from flowing along the first flow path while allowing flow along a second flow path through the vapor permeable membrane and out of the valve body.

17 Claims, 9 Drawing Sheets

Related U.S. Application Data continuation of application No. PCT/US2014/071118, filed on Dec. 18, 2014.

(60) Provisional application No. 61/918,297, filed on Dec. 19, 2013.

(51) Int. Cl.
*F16K 1/12* (2006.01)
*B60K 15/035* (2006.01)
*F01N 3/20* (2006.01)
*B60K 15/03* (2006.01)

(52) U.S. Cl.
CPC .............. *F16K 1/126* (2013.01); *F16K 31/22* (2013.01); *B60K 2015/03289* (2013.01); *F01N 2610/02* (2013.01); *F01N 2610/142* (2013.01); *F01N 2610/1406* (2013.01); *F01N 2610/1413* (2013.01); *F01N 2610/1466* (2013.01); *F01N 2900/1814* (2013.01); *Y02A 50/2325* (2018.01); *Y02T 10/24* (2013.01)

(58) Field of Classification Search
CPC ........... F01N 3/2066; F01N 2610/1466; F01N 2610/1413; F01N 2610/142; F01N 2610/02; F01N 2610/1406; F01N 2900/1814; Y02T 10/24
USPC ........................................................ 220/293
See application file for complete search history.

(56) References Cited

U.S. PATENT DOCUMENTS

| | | |
|---|---|---|
| 2006/0070656 A1 | 4/2006 | Crawford |
| 2010/0236640 A1 | 9/2010 | Erdmann |
| 2010/0319789 A1* | 12/2010 | Erdmann ........... F02M 25/0836 137/202 |
| 2012/0186677 A1 | 7/2012 | Wetzel et al. |

FOREIGN PATENT DOCUMENTS

| | | |
|---|---|---|
| DE | 102012009884 A1 | 11/2013 |
| EP | 0724098 A1 | 7/1996 |
| EP | 2492128 A1 | 8/2012 |
| WO | 2013169354 A1 | 11/2013 |

OTHER PUBLICATIONS

International Search Report and Written Opinion for International Application No. PCT/US2015/065682 dated Mar. 29, 2016, 12 pages.

\* cited by examiner

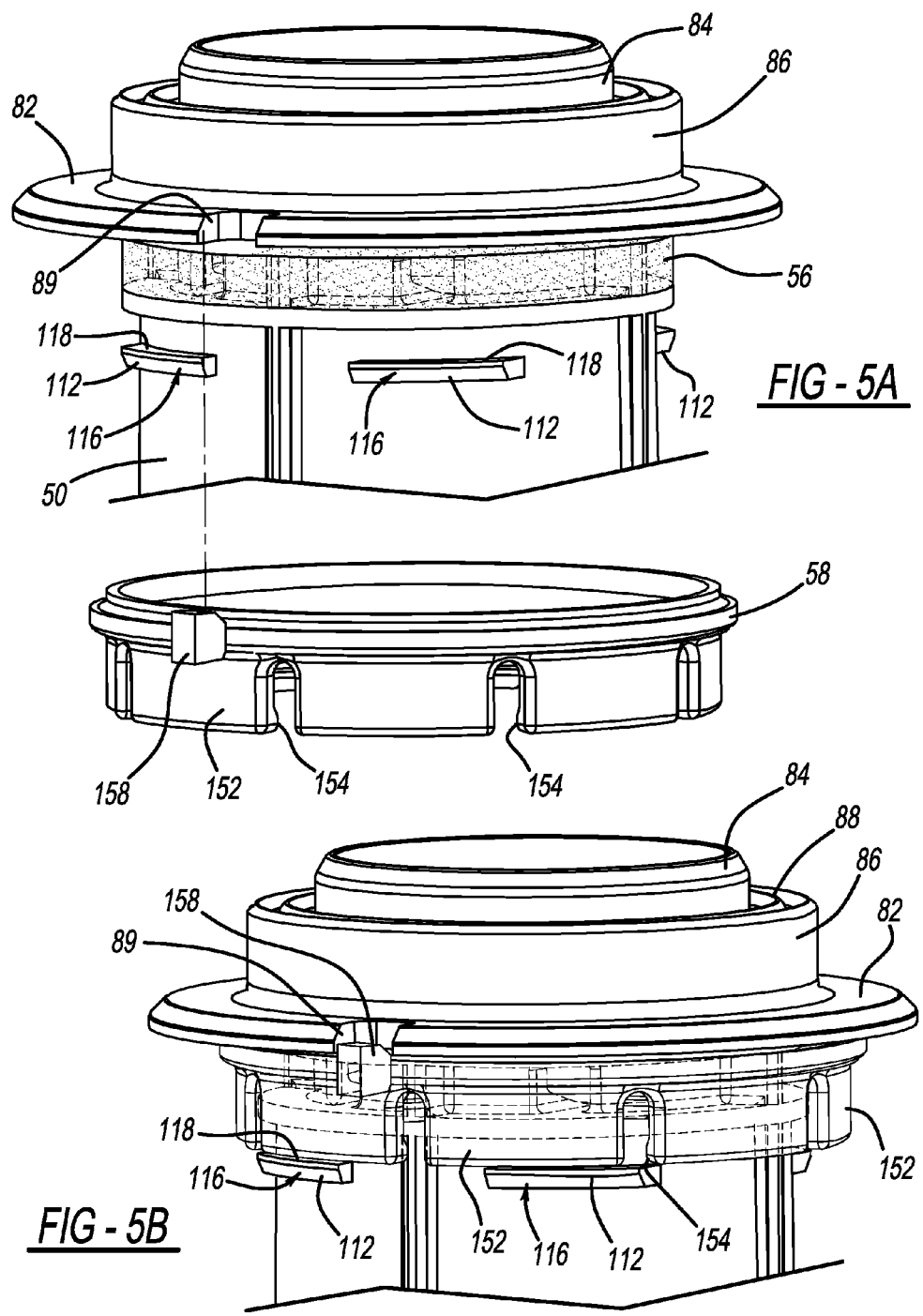

US 10,274,097 B2

FUEL LIMIT VENT VALVE HAVING VAPOR PERMEABLE MEMBRANE

CROSS-REFERENCE TO RELATED APPLICATIONS

This application is a continuation of PCT Application No. PCT/US2015/065682 filed Dec. 15, 2015 which claims the benefit of Indian Patent Application No. 3764/DEL/2014 filed on Dec. 18, 2014. This application is a continuation of PCT Application No. PCT/US2014/071118 filed on Dec. 18, 2014, which claims priority to U.S. Provisional Patent Application No. 61/918,297 filed on Dec. 19, 2013. The disclosures of the above applications are incorporated herein by reference.

FIELD

The present disclosure relates generally to tanks for storing liquid reductant and more particularly to a fill limit vent valve configured on the tank and that incorporates a vapor permeable membrane.

BACKGROUND

Selective catalytic reduction (SCR) systems are sometimes employed with compression-ignition engines to reduce nitrogen oxides in the exhaust stream. SCR systems require the use of a reductant, such as anhydrous ammonia, aqueous ammonia, or urea in the exhaust stream. In some systems, diesel fuel is chemically reformulated to create ammonia. In this regard, when the reductant is not derived from the main fuel of the engine, a separate tank is employed to store the reductant prior to injection of the reductant into the exhaust system.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A fill limit vent valve configured for used with a reductant tank on a selective catalyst reduction system includes a valve body, a vapor permeable membrane and a float. The valve body has a circumferential wall that extends between an upper tank mounting end and an opposite end. The valve body defines a valve body seat, at least one valve opening and a valve inner chamber. The vapor permeable membrane is disposed adjacent to the at least one valve opening and is configured to permit vapor to pass through the vapor permeable membrane and into the at least one valve opening while inhibiting liquid reductant from passing therethrough. The float has a float body configured to be received within the valve inner chamber. The float further comprises a float seal configured to sealingly engage the valve body seat. The float is movable between (i) an open position wherein vapor flows along a first flow path through the valve inner chamber and out of the valve body and (ii) a closed position wherein the float seal sealingly engages the valve body seat and precludes vapor from flowing along the first flow path. Vapor is permitted to flow along a second flow path through the vapor permeable membrane, through the at least one valve opening and out of the valve body.

According to additional features, the valve body comprises an annular lip that extends into the valve inner chamber. The annular lip can define an upper travel limit for the float. The annular lip can define a central opening. The first flow path flows through the central opening along the first flow path. The valve body seat is formed on the annular lip. The valve body comprises an annular flange. The at least one valve opening is formed through the annular flange.

According to other features, the fill limit vent valve can further include a clip that mounts around the circumferential wall of the valve body at the upper tank mounting end. The clip can align around the vapor permeable membrane. The clip can further comprise a series of fingers extending therefrom. The fingers can include gripping distal end portions. The valve body can include protruding ridges having corresponding ramp portions formed thereon. The gripping distal end portions of the fingers are configured to ride over the ramp portions until passing the protruding ridges whereupon the fingers locate in an assembled position. The valve body can further comprise a rim having a notch formed therein. The clip can include a locating tab configured to locate in a notch in the assembled position to inhibit rotation of the clip.

A fill limit vent valve configured for use with a reductant tank includes a valve body, a float and a vapor permeable membrane. The valve body can define an inner chamber and has a valve outlet. The float has a float body configured to be received within the inner chamber and configured to sealingly engage the valve body. The vapor permeable membrane can be disposed in the vent valve. The vapor permeable membrane can be configured to permit vapor to pass through while inhibiting liquid from passing through. The float is movable between (i) an open position wherein vapor flows along a first flow path through the valve inner chamber and out of the valve body; and (ii) a closed position wherein the float sealingly engages the valve body and precludes vapor from flowing along the first flow path. Vapor is permitted to flow along a second flow path through the vapor permeable membrane and out of the valve body.

According to other features, the valve body has a circumferential wall that extends between the upper tank mounting end and an opposite end. The valve body defines a valve body seat and at least one valve opening. The vapor permeable membrane is disposed adjacent to the at least one valve opening. The float further comprises a float seal configured to sealingly engage the valve body seat. The valve body defines a valve window. The float defines a float window. In the closed position, vapor is permitted to pass through the valve body window, through the float window and through the vapor permeable membrane.

According to additional features, the fill limit vent valve further comprises a clip that mounts around the valve body. The clip aligns around the vapor permeable membrane. The clip further comprises a series of fingers extending therefrom, the fingers include gripping distal end portions. The valve body includes protruding ridges having corresponding ramp portions formed thereon. The gripping distal end portions of the fingers are configured to ride over the ramp portions until passing the protruding ridges whereupon the fingers located in an assembled position. The valve body can further comprise a rim having a notch formed therein. The clip includes a locating tab configured to located in the notch in the assembled position to inhibit rotation of the clip.

BRIEF DESCRIPTION OF THE DRAWINGS

The present disclosure will become more fully understood from the detailed description and the accompanying drawings, wherein:

FIG. 5A is a partial perspective view of the valve body, membrane and clip of the fill limit vent valve of the present disclosure and shown with the clip in an unassembled position;

FIG. 5B is a partial perspective view of the valve body, membrane and clip of FIG. 5A and shown in an assembled position;

DETAILED DESCRIPTION

Figure 1:
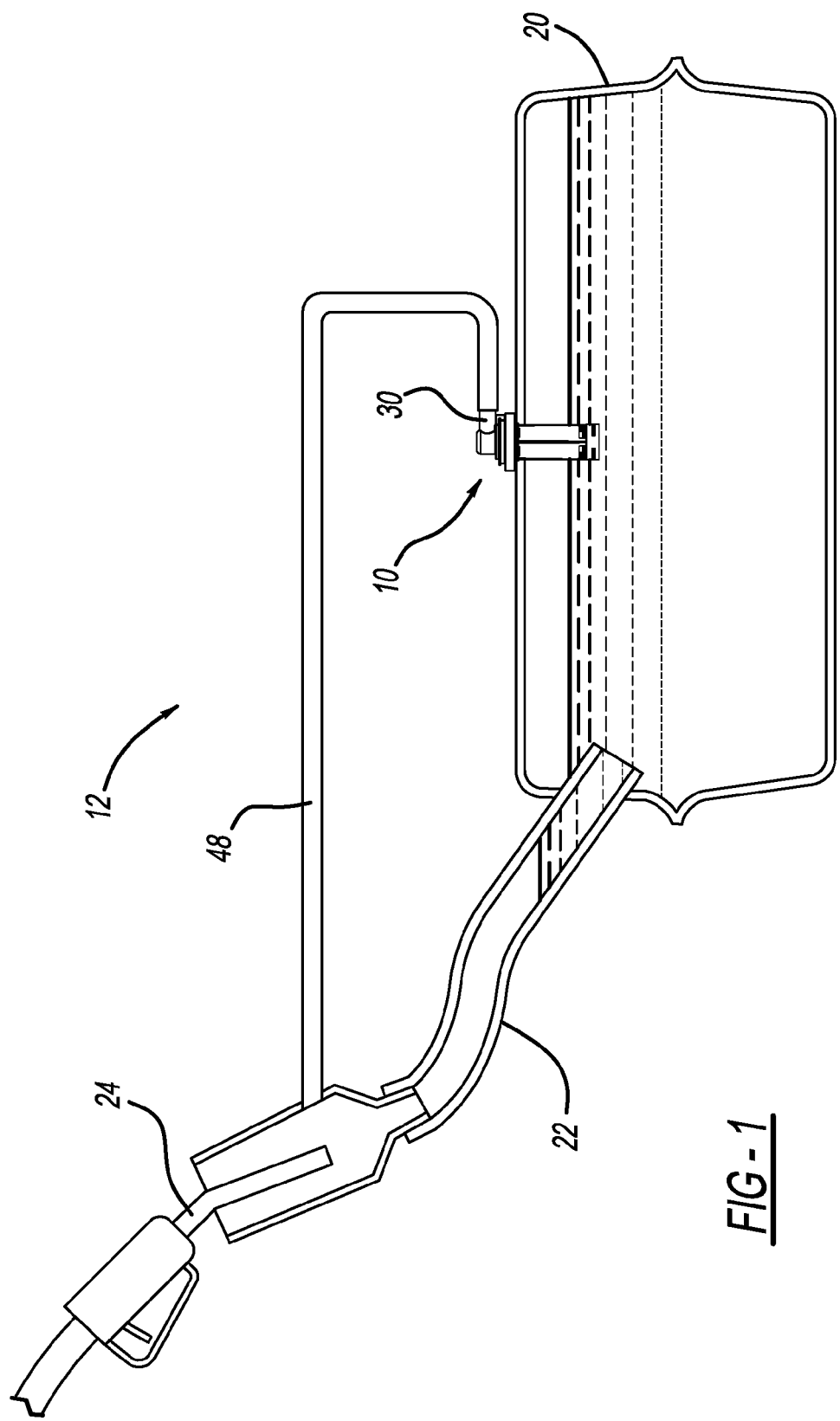
FIG. 1 is a schematic illustration of a reductant tank that incorporates a fill limit vent valve constructed in accordance to one example of the present disclosure.

With initial reference now to FIG. 1, fill limit vent valve constructed in accordance to one example of the present disclosure is shown and generally identified at reference 10. The fill limit vent valve 10 is shown as part of a selective catalytic reduction (SCR) system 12 that generally includes a liquid reductant tank 20 having a filler neck 22. The filler neck 22 is shown in FIG. 1 with a filler nozzle 24 received therein.

The fill limit vent valve 10 is disposed through a top wall of the vehicle liquid reductant tank 20. The fill limit vent valve 10 includes an outlet 30 connected through a vapor recirculation line 48. The vapor recirculation line 48 can be fluidly connected at a first end to the upper end of the filler neck 22 and connected at an opposite end to the outlet 30. The vapor recirculation line 48 can provide vapor recirculation of a portion of the vapor flowing from the outlet 30. The recirculation can be facilitated by the aspiration effect of the flow of the liquid reductant in the filler neck 22 during refilling.

With continued reference to FIG. 1 and additional reference now to FIG. 2, the fill limit vent valve 10 will be described in greater detail. The fill limit vent valve 10 generally includes a valve body 50, a float 54, a vapor permeable membrane 56, a clip 58, a plug 60 and a valve outlet connector body 62. A float seal 66 can be disposed on the float 54. The float 54 is configured to move within the valve body 50 between a normally open position (FIG. 3) and a closed position (FIG. 4). As will become appreciated from the following discussion, the vapor permeable membrane 56 can be configured to allow vapor to pass therethrough while precluding liquid from passing therethrough. The vapor permeable membrane 56 can be a single annular member or may be comprised of a split membrane having two or more sections.

The valve body 50 will now be described in greater detail. The valve body 50 generally comprises an elongated body 70 having an outer circumferential wall 72 that extends between an upper tank mounting end 74 and an opposite end 76. The outer circumferential wall 72 defines a valve inner chamber 80 that receives the float 54. The upper tank mounting end 74 can further include a rim 82, an inner annular flange 84, an outer annular flange 86 and an intermediate annular flange 88. The rim 82 can define a locating notch 89 thereon. An annular lip 90 can extend into the valve inner chamber 80 and define an upper travel limit for the float 54. The annular lip 90 can have a valve body seat 94 and define a central opening 96. The inner annular flange 84 can define a valve body outlet 102 that is fluidly connected to the outlet 30 of the fill limit vent valve 10.

The opposite (lower) end 76 of the valve body 50 can define a recessed bore 104 that is configured to receive the plug 60. The plug 60 can have legs 106 configured to engage complementary structure on the valve body 50. The plug 60 can define a plug passage 108.

Valve openings 110 are defined through the valve body 50 generally at the upper tank mounting end 74. In the particular example shown, the valve openings 110 are formed through the annular lip 90 and the inner annular flange 84. In one configuration four valve openings 110 are provided on the valve body 50, however, more or less valve openings 110 may be included. As will be described more fully herein, the valve openings 110 are configured to align for cooperation with the vapor permeable membrane 56 to allow vapor to pass therethrough. In the example shown, the vapor permeable membrane 56 is mounted around the outer circumferential wall 72 of the valve body 50 near the upper tank mounting end generally against the valve openings 110.

A series of protruding ridges 112 extend outwardly from the valve body 50 near the upper tank mounting end 74. Each of the protruding ridges 112 can include a ramped surface 116 and a retaining ledge 118. As will be described herein, the protruding ridges 112 can locate the clip 58 at a location between the protruding ridges 112 and the rim 82. The clip 58 therefore can nest annularly around the upper tank mounting end 74 outboard of the membrane 56. In this regard, the clip 58 can surround and protect the vapor permeable membrane 56.

The float 54 will now be described in greater detail. The float 54 can be formed of rigid plastic material and be configured to respond or float in a direction up and down as viewed in FIGS. 3 and 4 based on contact with liquid reductant. The float 54 can generally include a float body 120 that includes an outer circumferential portion 122 and an inner circumferential portion 124. A knob 128 extends from an upper end 130 of the float body 120. The knob 128 defines a neck 134 that captures the float seal 66 thereon.

Figure 2:
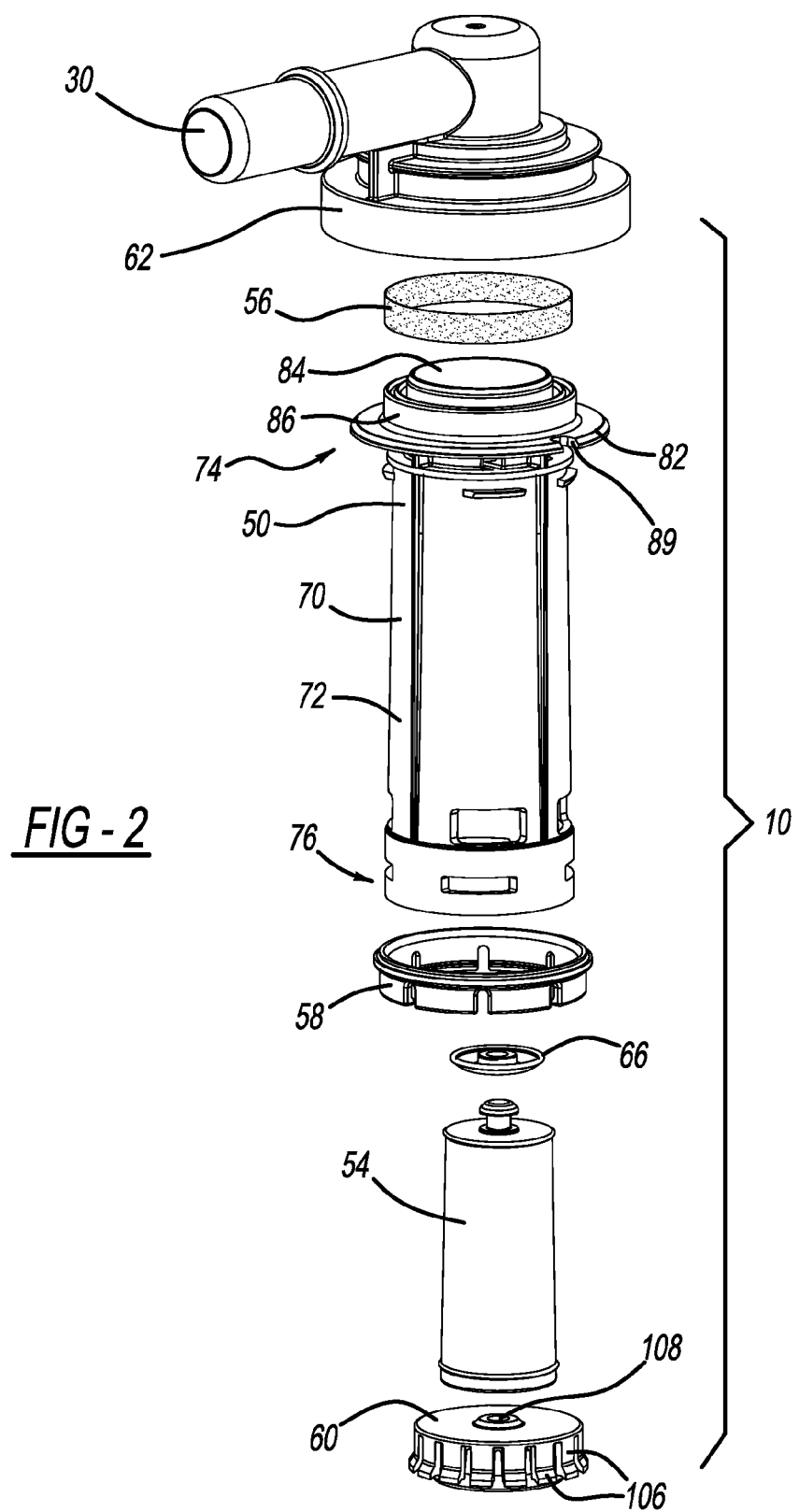
FIG. 2 is an exploded view of the fill limit vent valve of FIG. 1, the fill limit vent valve incorporating a valve body, a vapor permeable membrane, a clip and a float.
Figure 3:
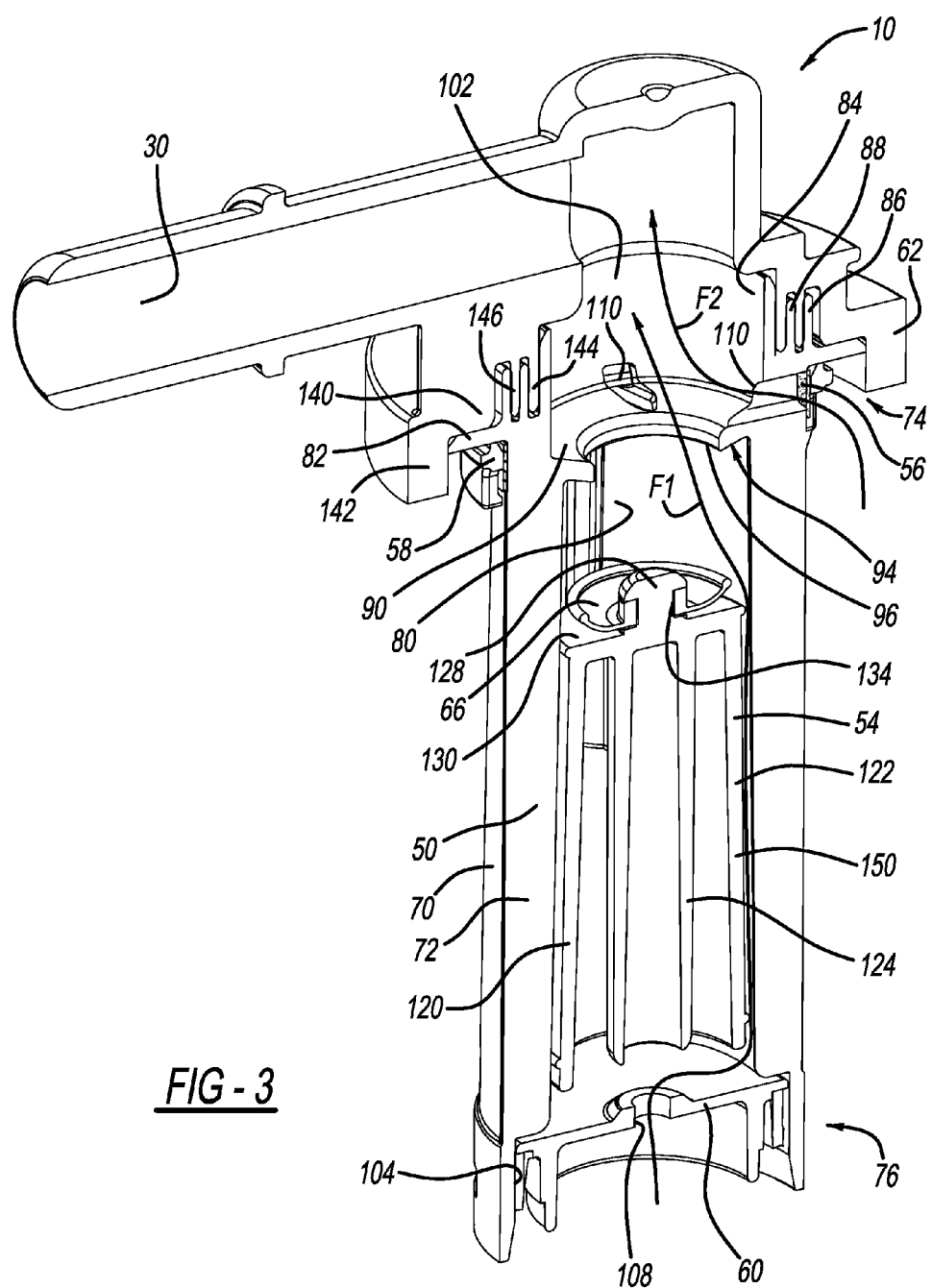
FIG. 3 is a sectional view of the fill limit vent valve of FIG. 2 and shown with the float in a normally open position allowing venting around the float and out through a valve outlet connector body in a first vent path.
Figure 4:
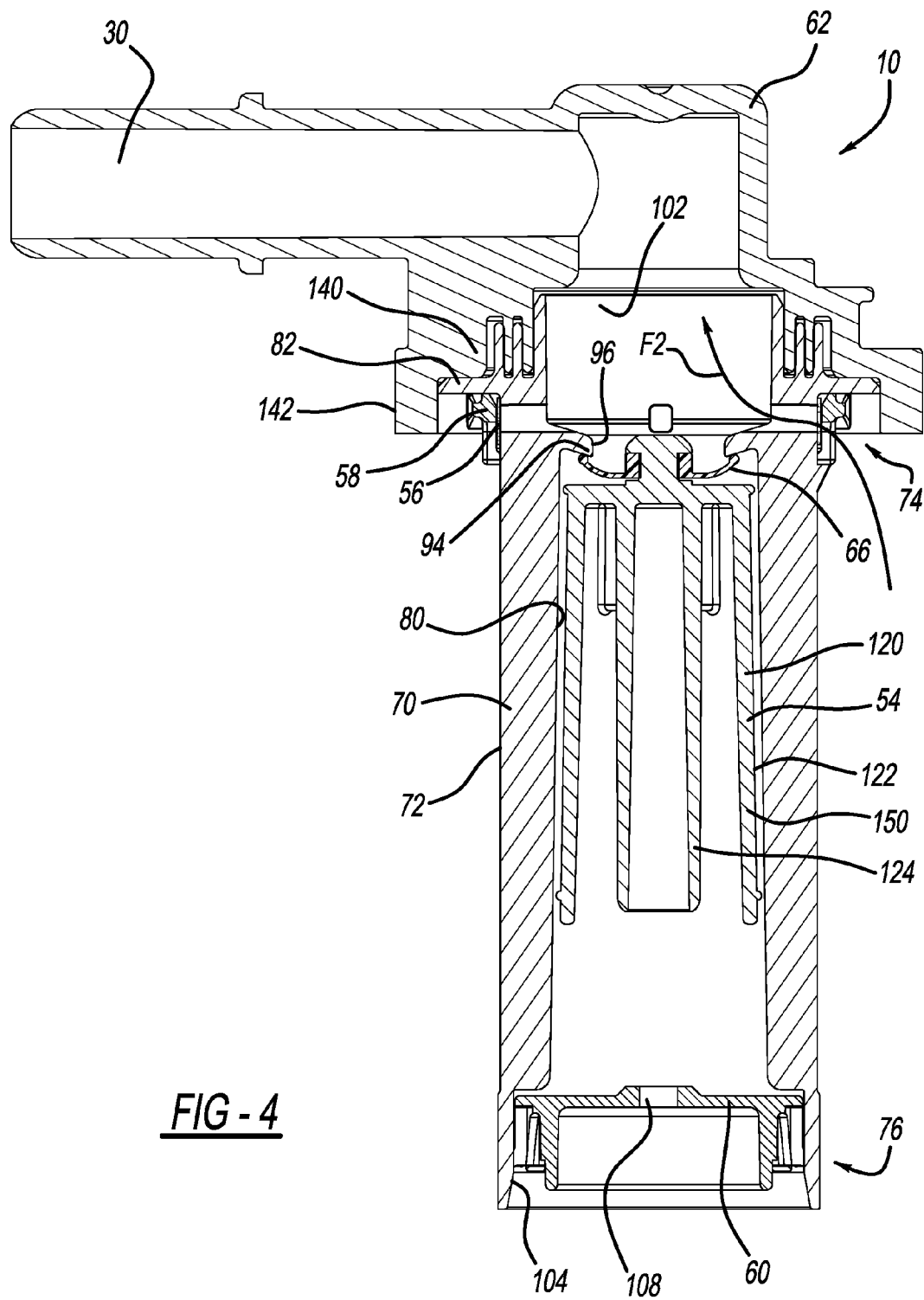
FIG. 4 is a sectional view of the fill limit vent valve of FIG. 3 and shown with the float moved upward to a closed position where vapor is vented through the vapor permeable membrane in a second vent path, the vapor permeable membrane inhibiting liquid to pass therethrough.

With reference now to FIGS. 2 and 3, the valve outlet connector body 62 will be described in greater detail. The valve outlet connector body 62 can generally include a lower connecting flange 140 and an annular skirt 142. The valve outlet connector body 62 can additionally include an inner locating ring 144 and an outer locating ring 146.

With particular reference to FIGS. 5A and 5B, the clip 58 will be described in greater detail. As identified above, the clip 58 is configured to locate between the protruding ridges 112 of the valve body 50 and the rim 82 (FIG. 5B). The clip 58 includes a series of fingers 152 extending therefrom. The fingers 152 include gripping distal end portions 154. A locating tab 158 extends from the clip 58 and is configured to locate at the notch 89 of the rim 82 (FIG. 5B). The locating tab 158 and the notch 89 cooperate to inhibit rotation of the clip 58. The gripping distal end portions 154 can be configured to ride over the respective ramped surfaces 116 of the protruding ridges 112 (progressively deforming outwardly) until clearing the ridges 112 at which point the fingers 152 can plastically snap into place into an assembled position. The respective ledges 118 of the ridges 112 can bound and/or engage the distal end portions 154 to maintain the clip in the assembled position (FIG. 5B).

Operation of the fill limit vent valve 10 according to one example of the present disclosure will now be described. With initial reference to FIG. 3, the fill limit vent valve 10 is shown in a normally open position. In the normally open position, reductant vapor is permitted to flow along a first flow path F1 from inside the liquid reductant tank 20, through the plug passage 108, around the float 54, through the central opening 96 and out the valve body outlet 102. In the normally open position, vapor is also permitted to flow along a second flow path F2 through the vapor permeable membrane 56, through the valve openings 110 and out the valve body outlet 102.

With reference now to FIG. 4, the fill limit vent valve 10 is shown in a closed position. In the closed position, the float 54 is moved upward within the valve inner chamber 80. The float 54 can be caused to move up when liquid reductant has been added to the liquid reductant tank 20 and the liquid reductant tank 20 reaches a "full" level. In the closed position, the float seal 66 attains a sealing position with the valve body seat 94. The float seal 66 and the valve body seat 94 therefore block flow of liquid reductant and vapor through the central opening 96. Vapor however is still permitted to escape the reductant tank 20 along the flow path F2. Specifically, vapor is allowed to flow through the vapor permeable membrane 56, through the valve openings 110 and out the valve body outlet 102. In a roll-over condition or when the reductant tank is inverted, the float 54 will remain in the closed position and liquid reductant will be inhibited from escaping through the valve body outlet 102.

Figure 6A:
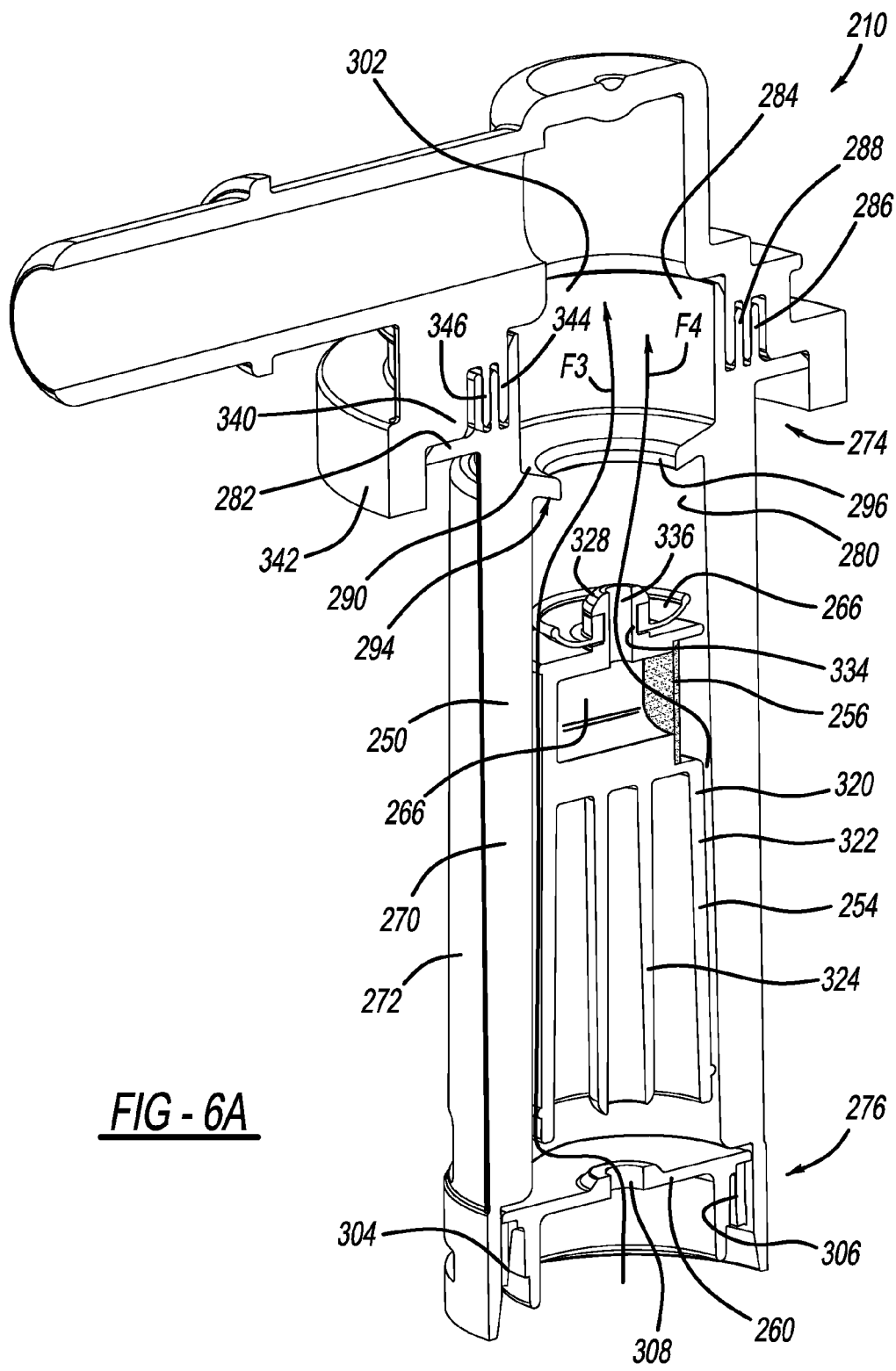
FIG. 6A is a sectional view of a fill limit vent valve constructed in accordance to additional features of the present disclosure and shown with the float in a normally open position allowing venting around the float and out through a valve outlet connector body in a first vent path.
Figure 6B:
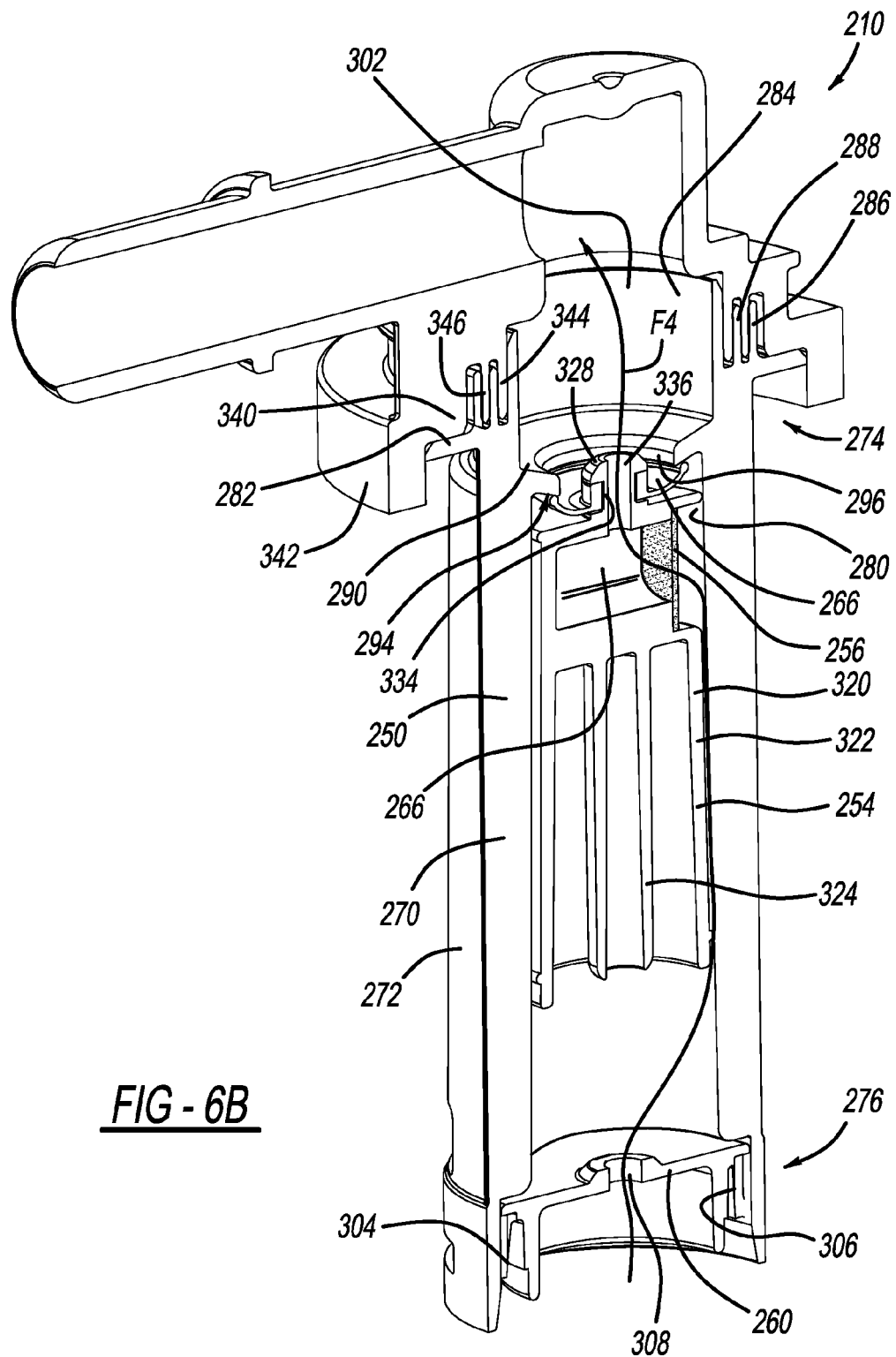
FIG. 6B is a sectional view of the fill limit vent valve of FIG. 6A and shown with the float in a closed position where vapor is vented through the vapor permeable membrane in a second vent path, the vapor permeable membrane inhibiting liquid to pass therethrough.
Figure 7:
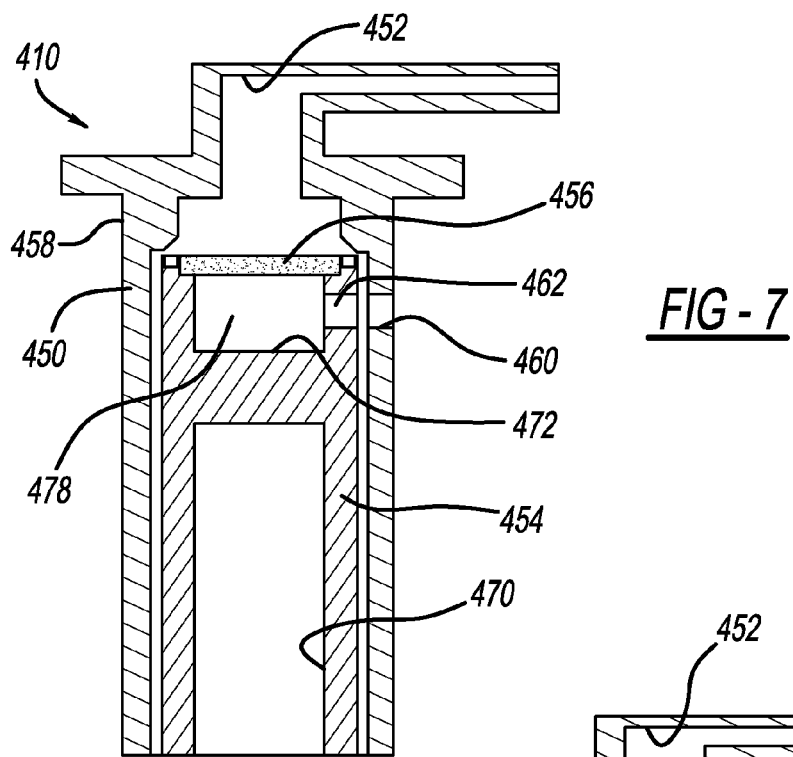
FIG. 7 is a sectional view of a fill limit vent valve constructed in accordance to other features of the present disclosure.
Figure 8:
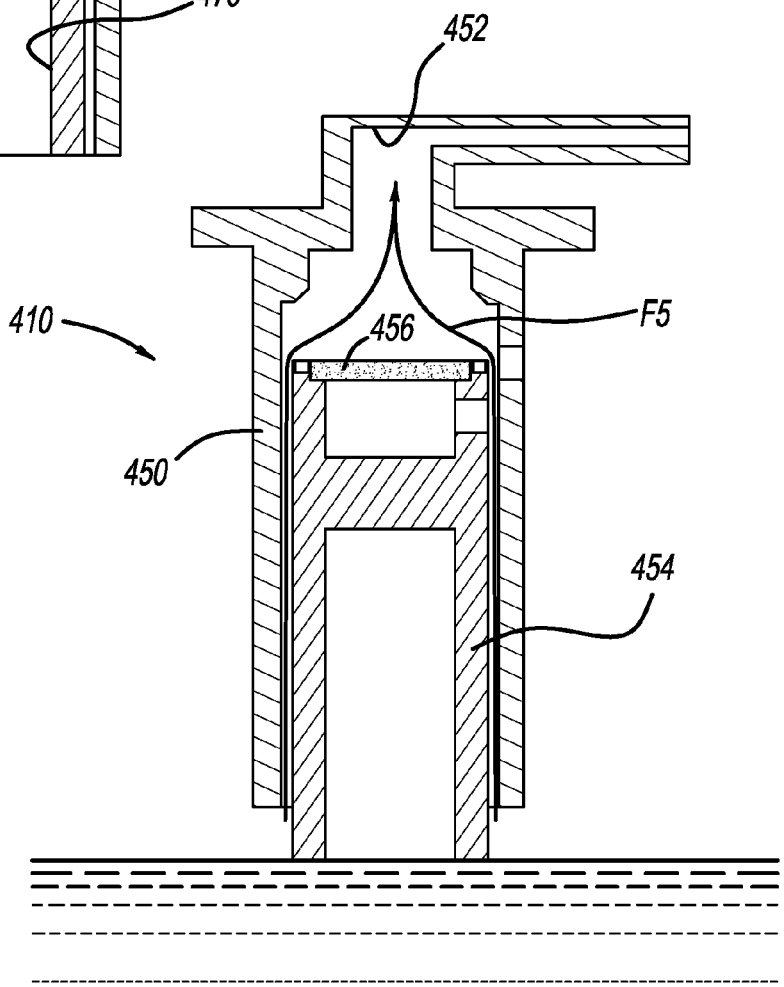
FIG. 8 is a sectional view of the fill limit vent valve of FIG. 7 and shown with the float in a normally open position allowing venting around the float and out through a valve outlet connector body in a first vent path.
Figure 9:
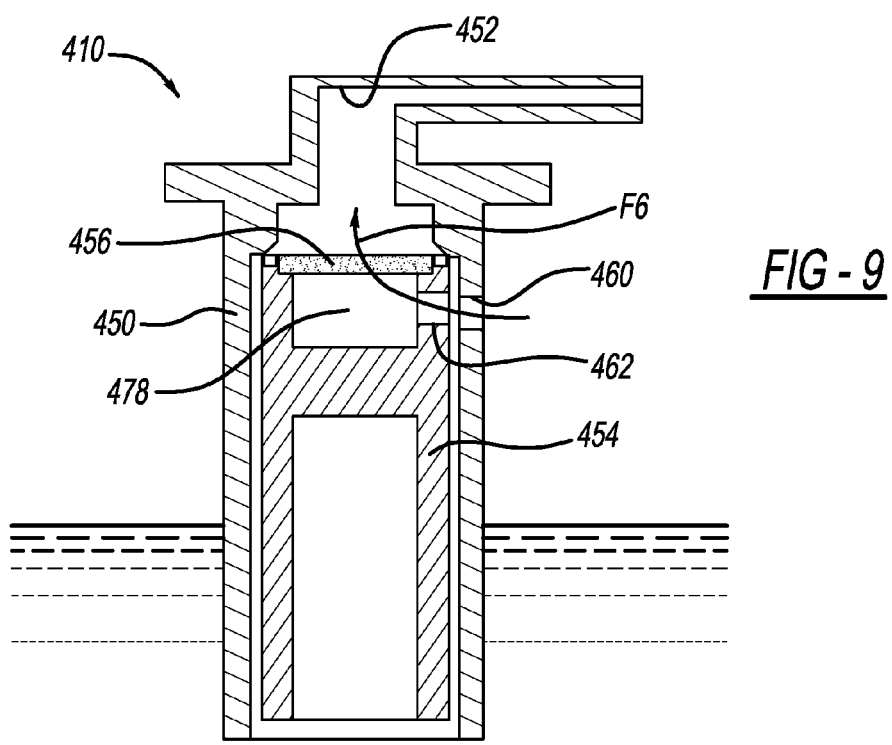
FIG. 9 is a sectional view of the fill limit vent valve of FIG. 8 and shown with the float in a closed position where vapor is vented through the vapor permeable membrane in a second vent path, the vapor permeable membrane inhibiting liquid to pass therethrough.
Figure 10:
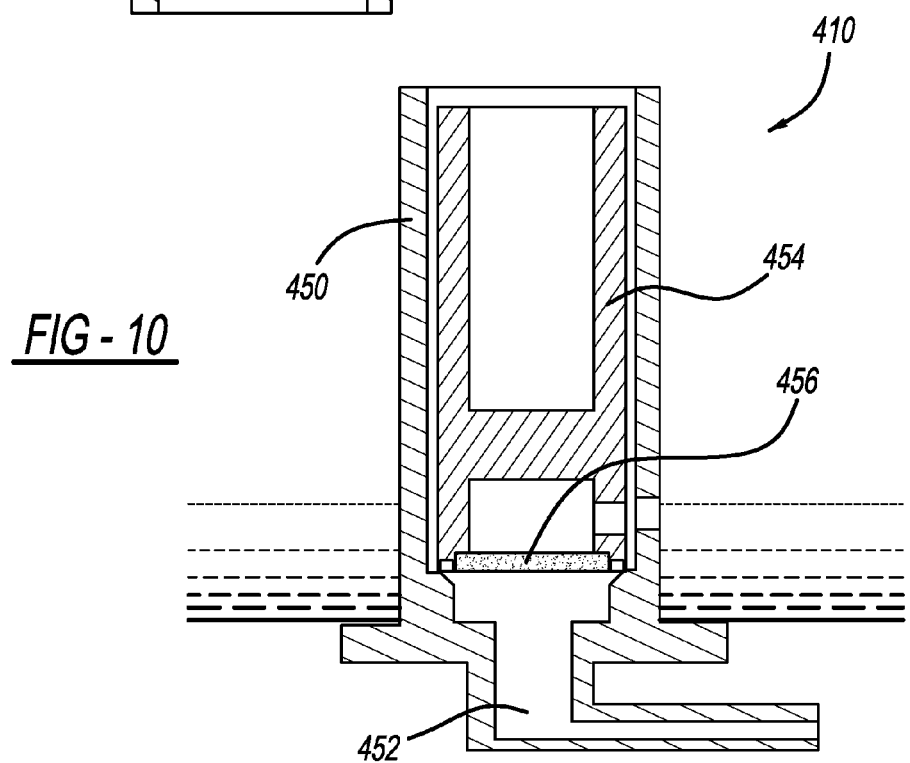
FIG. 10 is a sectional view of the fill limit vent valve of FIG. 7 and shown during a roll over event where no liquid is permitted to pass through the valve outlet connector body.

Turning now to FIGS. 6A and 6B, a fill limit vent valve 210 constructed in accordance to another example of the present disclosure will be described. The fill limit vent valve 210 may be used in the selective catalyst reduction system 12 described above with respect to FIG. 1. The fill limit vent valve 210 generally includes a valve body 250, a float 254, a vapor permeable membrane 256, a plug 260 and a valve outlet connector body 262. A float seal 266 can be disposed on the float 254. The float 254 can be configured to move within the valve body 50 between a normally open position (FIG. 6A) and a closed position (FIG. 6B). The vapor permeable membrane 256 can be configured to allow vapor to pass therethrough while precluding liquid reductant from passing therethrough. The vapor permeable membrane 256 is incorporated on the float 254 and provides an outer boundary of a float chamber 266 provided on the float 254.

The valve body 250 will now be described in greater detail. The valve body 250 generally comprises an elongated body 270 having an outer circumferential wall 272 that extends between an upper tank mounting end 274 and an opposite end 276. The outer circumferential wall 272 defines a valve inner chamber 280 that receives the float 254. The upper tank mounting end 274 can further include a rim 282, an inner annular flange 284, an outer annular flange 286 and an intermediate annular flange 288. An annular lip 290 can extend into the valve inner chamber 280 and define an upper travel limit for the float 254. The annular lip 290 can have a valve body seat 294 and define a central opening 296. The inner annular flange 284 can define a valve body outlet 302 that can be fluidly connected to the outlet 30 (FIG. 1) of the fill limit vent valve 10.

The opposite (lower) end 276 of the valve body 250 can define a recessed bore 304 that is configured to receive the plug 260. The plug 260 can have legs 306 configured to engage complementary structure on the valve body 250. The plug 260 can define a plug passage 308.

The float 254 will now be described in greater detail. The float 254 can be formed of rigid plastic material and be configured to respond or float in a direction up and down as viewed in FIGS. 6A and 6B based on contact with liquid reductant. The float 254 can generally include a float body 320 that includes an outer circumferential portion 322, and an inner circumferential portion 324. A knob 328 extends from an upper end 330 of the float body 320. The knob 328 defines a neck 334 that captures the float seal 266 thereon. The knob 328 further defines a float passage 336.

The valve outlet connector body 262 can be constructed similar to the valve outlet body 62 described above. In this regard, the valve outlet connector body 262 can generally include a lower connecting flange 340 and an annular skirt 342. The valve outlet connector body 262 can additionally include an inner locating ring 344 and an outer locating ring 346.

Operation of the fill limit vent valve 210 according to one example of the present disclosure will now be described. With initial reference to FIG. 6A, the fill limit vent valve 210 is shown in a normally open position. In the normally open position, vapor is permitted to flow along a first flow path F3 from inside the liquid reductant tank 20, through the plug passage 308, around the float 254, through the central opening 296 and out the valve body outlet 302. In the normally open position, vapor is also permitted to flow along a second flow path F4 through the vapor permeable membrane 256, through the float passage 336, through the central opening 296 and out the valve body outlet 302.

With reference now to FIG. 6B, the fill limit vent valve 210 is shown in a closed position. In the closed position, the float 254 is moved upward within the valve inner chamber 280. The float 254 can be caused to move up when liquid reductant has been added to the liquid reductant tank 20 and the liquid reductant tank 20 reaches a "full" level. In the closed position, the float seal 266 attains a sealing position with the valve body seat 294. The float seal 266 and the valve body seat 294 therefore block flow path F3 (FIG. 6A) of liquid reductant and vapor through the central opening 96. Vapor however is still permitted to escape the reductant tank 20 along the flow path F4. Specifically, vapor is allowed to flow through the vapor permeable membrane 256, through the float passage 336, through the central opening 296 and out the valve body outlet 302. In a roll-over condition or when the reductant tank 20 is inverted, the float 254 will remain in the closed position and liquid reductant will be inhibited from escaping through the valve body outlet 102.

Turning now to FIGS. 7-10, a fill limit vent valve 410 constructed in accordance to other features of the present disclosure will be described. The fill limit vent valve 410 generally includes a valve body 450 having a valve outlet 452, a float 454, and a vapor permeable membrane 456. The valve body 450 defines an inner chamber 458 and a valve window 460. The float 454 defines a float window 462. The float 454 further defines a lower recessed portion 470 and an upper recessed portion 472. The upper recessed portion 472 together with the vapor permeable membrane 456 defines an upper chamber 478.

In a normally open position (FIG. 8), the vapor is permitted to flow along flow path F5 around the float 454 and out of the valve outlet 452. In a closed position (FIG. 9), the float 454 moves upward to sealingly engage the valve body 454. In the closed position, vapor is permitted to flow along the flow path F6, through the valve window 460, through the float window 462, through the vapor permeable membrane 456 and out of the valve outlet 452. Of note, liquid reductant cannot pass through the vapor permeable membrane 456. Liquid can be blocked from further movement out of the fill limit vent valve 410 in the upper chamber 478. In a roll-over condition (FIG. 10), the float 454 sealingly engages the valve body 450 and liquid reductant is precluded from exiting through the valve outlet 452.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A fill limit vent valve configured for use with a reductant tank, the fill limit vent valve comprising:
a valve body having a circumferential wall that extends between an upper tank mounting end and an opposite end, the valve body defining a valve body seat, at least one valve opening and a valve inner chamber;
an annular vapor permeable membrane disposed around the circumferential wall of the valve body and adjacent to the at least one valve opening and configured to permit vapor to pass through the vapor permeable membrane and into the at least one valve opening while inhibiting liquid from passing therethrough;
a clip that mounts around the circumferential wall of the valve body at the upper tank mounting end, the clip circumscribing the vapor permeable membrane;
a float having a float body configured to be received within the valve inner chamber, the float further comprising a float seal configured to sealingly engage the valve body seat; and
the float movable between (i) an open position wherein vapor flows along a first flow path through the valve inner chamber and out of the valve body; and (ii) a closed position wherein the float seal sealingly engages the valve body seat and precludes vapor from flowing along the first flow path, wherein vapor is permitted to flow along a second flow path through the vapor permeable membrane, through the at least one valve opening and out of the valve body.

2. The fill limit vent valve of claim 1 wherein the valve body comprises an annular lip that extends into the valve inner chamber, the annular lip defining an upper travel limit for the float.

3. The fill limit vent valve of claim 2 wherein the annular lip defines a central opening, wherein the first flow path flows through the central opening along the first flow path.

4. The fill limit vent valve of claim 2 wherein the valve body seat is formed on the annular lip.

5. The fill limit vent valve of claim 4 wherein the valve body comprises an annular flange wherein the at least one valve opening is formed through the annular flange.

6. The fill limit vent valve of claim 1 wherein the clip further comprises a series of fingers extending therefrom, the fingers including gripping distal end portions.

7. The fill limit vent valve of claim 6 wherein the valve body includes protruding ridges having corresponding ramp portions formed thereon, wherein the gripping distal end portions of the fingers are configured to ride over the ramp portions until passing the protruding ridges whereupon the fingers locate in an assembled position.

8. The fill limit vent valve of claim 7 wherein the valve body further comprises a rim having a notch formed therein, wherein the clip includes a locating tab configured to locate in the notch in the assembled position to inhibit rotation of the clip.

9. The fill limit vent valve of claim 7 wherein the fingers are configured to progressively deform outwardly while riding over the ramp portions until clearing the protruding ridges at which point the fingers plastically snap into place into an assembled position.

10. A fill limit vent valve configured for use with a reductant tank, the fill limit vent valve comprising: a valve body that defines an inner chamber and has a valve outlet;
a float having a float body configured to be received within the inner chamber and configured to sealingly engage the valve body;
an annular vapor permeable membrane disposed in the vent valve, the vapor permeable membrane configured to permit vapor to pass through while inhibiting liquid from passing through;
a clip that mounts around the valve body at the upper tank mounting end, the clip circumscribing the annular vapor permeable membrane; and
the float movable between (i) an open position wherein vapor flows along a first flow path through the valve inner chamber and out of the valve body; and (ii) a closed position wherein the float sealingly engages the valve body and precludes vapor from flowing along the first flow path, wherein vapor is permitted to flow along a second flow path through the vapor permeable membrane and out of the valve body.

11. The fill limit vent valve of claim 10 wherein the valve body has a circumferential wall that extends between an upper tank mounting end and an opposite end, the valve body defining a valve body seat, and at least one valve opening.

12. The fill limit vent valve of claim 11 wherein the vapor permeable membrane is disposed adjacent to the at least one valve opening.

13. The fill limit vent valve of claim 12 wherein the float further comprises a float seal configured to sealingly engage the valve body seat.

14. The fill limit vent valve of claim 10 wherein the clip further comprises a series of fingers extending therefrom, the fingers including gripping distal end portions.

15. The fill limit vent valve of claim 14 wherein the valve body includes protruding ridges having corresponding ramp portions formed thereon, wherein the gripping distal end portions of the fingers are configured to ride over the ramp portions until passing the protruding ridges whereupon the fingers locate in an assembled position.

16. The fill limit vent valve of claim 15 wherein the valve body further comprises a rim having a notch formed therein, wherein the clip includes a locating tab configured to locate in the notch in the assembled position to inhibit rotation of the clip.

17. The fill limit vent valve of claim 15 wherein the fingers are configured to progressively deform outwardly while riding over the ramp portions until clearing the protruding ridges at which point the fingers plastically snap into place into an assembled position.

* * * * *